United States Patent

[11] 3,593,026

| | | | | |
|---|---|---|---|---|
| [72] | Inventors | Teiji Uchida;<br>Motoaki Furukawa; Ryuji Tatsumi, all of Tokyo, Japan | [50] | Field of Search........................... 350/96, 179; 250/201, 203, 227 |
| [21] | Appl. No. | 839,236 | [56] | References Cited |
| [22] | Filed | July 7, 1969 | | UNITED STATES PATENTS |
| [45] | Patented | July 13, 1971 | 3,423,593  1/1969  Chinnock..................... 250/201 X |
| [73] | Assignee | Nippon Selfoc Company Limited, c/o Nippon Electric Company, Limited Minato-ku, Tokyo, Japan | 3,434,774  3/1969  Miller........................... 350/96 |
| | | | 3,442,574  5/1969  Marcatili..................... 350/179 |
| | | | 3,470,320  9/1969  Pike et al..................... 350/96 X |
| [32] | Priority | July 6, 1968 | *Primary Examiner*—James W. Lawrence |
| [33] | | Japan | *Assistant Examiner*—T. N. Grigsby |
| [31] | | 43/46958 | *Attorney*—Sandoe, Hopgood and Calimafde |

[54] LIGHT DEFLECTION COMPENSATION DEVICE UTILIZING AN OPTICAL FIBER HAVING A REFRACTIVE INDEX GRADIENT WHICH DECREASES RADIALLY
3 Claims, 3 Drawing Figs.

[52] U.S. Cl....................................... 250/201, 250/203, 250/227, 350/96
[51] Int. Cl..................................... G01j 1/20, G02b 5/14

ABSTRACT: A light beam incident upon one end of a fibrous light guide of the type having a refractive index gradient greatest at its axis and decreasing towards the surface, has its position and angle of incidence on one end of the guide detected. The detected signal is employed to control the incident position and angle to maintain them at a predetermined value to fix position and angle parameters of the light emanating from the other end of the guide.

INVENTORS
TEIJI UCHIDA
MOTOAKI FURUKAWA
RYUJI TATSUMI by
Sandoe, Hopgood & Calimafde
ATTORNEYS.

LIGHT DEFLECTION COMPENSATION DEVICE UTILIZING AN OPTICAL FIBER HAVING A REFRACTIVE INDEX GRADIENT WHICH DECREASES RADIALLY

BACKGROUND OF THE INVENTION

This invention relates to a light deflection correction device and, more particularly, to a light deflection correction device for use in an optical communications system employing laser light.

The development of a highly efficient light transmission line has been desired in order to improve the reliability of light communication systems. Among the many problems to be resolved in order to realize reliable systems is the automatic correction of the deviation of the light beams; it is is to this problem that the disclosed invention addresses itself.

A fibrous converging light guide has a refractive index which is greatest at its axis and continuously decreases toward its surface in proportion to the square of the distance from the axis. When a light beam of an appropriate spot size is made incident upon the input end surface of the light guide at a suitable angle of incidence, the beam travels along the axis, oscillating thereabout without divergence.

In the July, 1964 Bell System Technical Journal, at pages 1469—1479, D. W. Berreman reported that light rays can be transmitted without divergence through a gas lens which has the aforementioned gradient in the refractive index. The converging light guide employed in the present invention may be analogized to the gas lens. (See, for example, the Proceedings of the IEEE, Dec. 1965, pages 2148—2149, wherein S. Kawakami and J. Nishizawa describe such a light guide as similar to a lens.)

When a laser beam of fundamental mode is made incident upon the input end surface of the light guide, the light beam should have a specific cross-sectional diameter. The cross-sectional area of the light beam is determined by the refractive index gradient. According to S.E. Miller's report published in the Nov. 1965 Bell System Technical Journal, pages 2017—2064, the spot size Wo of a laser light beam of fundamental mode incident thereupon and matched with the optical elements is expressed by:

$$W_0 = \left(\frac{\lambda o}{\pi n_a}\right)^{1/2} a_2^{1/4} \quad (1)$$

(where $\lambda o$ is a light wavelength in free space), when the refractive index $n$ of the light guide at a point of radial distance $x$ from the axis toward the surface of the light guide is expressed by:

$$n = n_a \left(1 - \frac{1}{2} a_2 x^2\right) \quad (2)$$

(where $n_a$ is the refractive index on the axis, and $a_2$ is a positive constant).

Also, according to the Miller article, it is known that a light beam incident upon the light guide is usually emitted at a position and angle dependent on the angle and position of incidence at the input end surface plane and upon the length and refractive index gradient of the light guide.

Current manufacturing techniques are capable of producing a light guide whose $n_a$ is about 1.6 and $a_2$ is about 100 cm.[11]. The spot size in the case of such converging light guide for a laser beam of 6328 A. is 11.6 microns calculated from the above-mentioned equation. For the light beams of this size, the light guide of the diameter of about 100 microns would be suited to realize the transmission with minimized loss. It is obvious that such a light guide is flexible and, therefore, when used for a light transmission line, is excellent compared with gas lens.

OBJECTS OF THE INVENTION

Accordingly, it is the object of this invention to provide a device to facilitate the automatic correction of the deviation of light beams.

It is a further object of this invention to satisfy the foregoing object employing a fibrous converging light guide, for example, a glass fiber.

BRIEF SUMMARY OF THE INVENTION

According to this invention, a transmission path of high reliability can be realized for carrier light waves, utilizing the nature of a fibrous converging light guide and means for controlling the position and angle of incidence at the input end of the light guide, whereby the position and angle of the outgoing light beam formed with the axis of the light guide are kept constant.

The above-mentioned and other features and objects of this invention and the manner of attaining them will become more apparent and the invention itself will best be understood by reference to the following description of embodiments of the invention taken in conjunction with the accompanying drawings, the description of which follows.

DETAILED DESCRIPTION OF THE INVENTION

Figure 1:
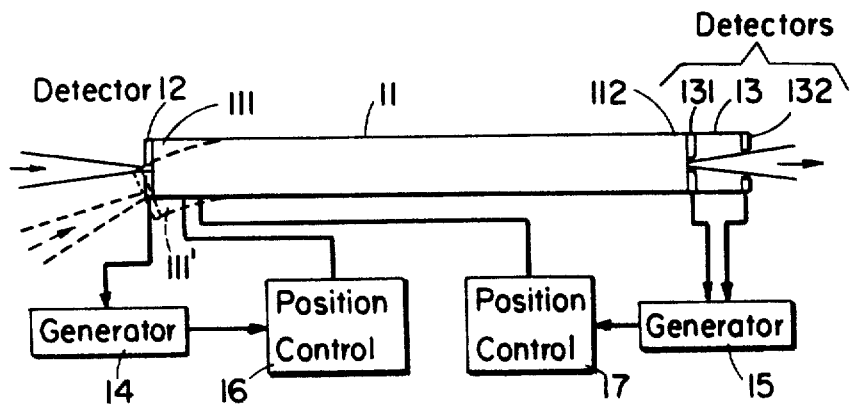
FIG. 1 shows, schematically, a first embodiment of the invention.

FIG. 1 shows an embodiment of the invention in which the position of incidence of the light beam at the input end surface of the converging light guide is detected to produce a control signal which serves to maintain the incident position constant. At the same time, the position and angle of the output light beam at the output end is detected to produce another signal which serves to change the direction of the axis of the light guide at the input end. Detector 12 detects the deviation of the position of incidence at the input end 111 attached to the converging light guide. The output of the detector 12 which represents the deviation of the point of incidence is supplied to a control signal generator 14, which comprises a pair of differential amplifiers for, respectively, the X and Y coordinates, and pulse generators associated respectively with the amplifiers. The output of these generators 14 energizes in a well-known manner a control device 16 which is composed of a pair of pulse motors to correct the X and Y coordinate positions so that the input light beam may always be incident upon a predetermined position at the input end 111. The angle of incidence of the input light beam is corrected in response to the output of a detector 13 attached at the output end of the light guide 11. The detector 13 consists of a light emission position detector 131 for detecting the deviation of the output beam and a light emission angle detector 132 for detecting the deviation of the angle of emission. The output of detector 13 is supplied to another control signal generator 15, which is composed of constituent parts similar to the control signal generator 14. The output of the generator 15 energizes the control device 17, which is similar to the device 16 to change the direction of the input end 111 of the light guide 11 so as to optimize the angle of incidence of the input light beam. The drawing shows the state wherein the input end 111 is moved to 111' through the above-described control.

It is apparent from equations (10) and (11) of the referred to Miller report that the deviation of the position and angle of emission is the function only of the deviation of the angle of incidence of the input light beam when the position of incidence is kept unchanged. Hence, it is possible to control the angle of incidence so that the position and angle of emission may be kept constant through a control signal produced by the angle control signal generator 15 in response to the output of the detector 13.

Figure 2:
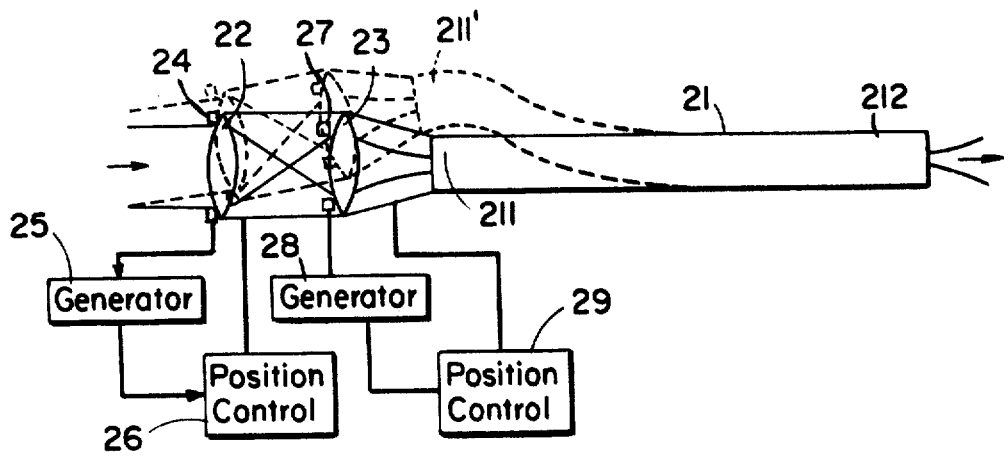
FIG. 2 shows, schematically, a second embodiment of the invention.

FIG. 2 shows another embodiment wherein converging lenses 22 and 23, and an input end 211 of the converging light guide 21 are coaxially fixed at a certain spatial interval with respect to one another. The positions of the lenses 22 and 23 and the direction of the optical axis are controlled to correct the position and angle of emission of the output light beam emitted from the input end 211. When the position of incidence of the light beam at the first condensing lens 21 is changed, this positional displacement is detected by the position detector 24 disposed at the circumference of the lens 22. The output of the detector 24 is supplied to the position control signal generator 25 which is similar to the generator 14 employed in the embodiment of FIG. 1. Thus, the position control signal generator 25 generates a control signal to energize the position control device 26 which is similar to device 16 to move the lenses 22 and 23 and the input end 211 so that the input light beam may be incident upon the predetermined position of incidence of condensing lens 22. An angle detector 27 equipped at the circumference of the second condensing lens 23 similarly detects the deviation of the light beam incident upon the second condensing lens 23. The resultant output is sent to a position control signal generator 28 which is the counterpart of the element 15 of the embodiment of FIG. 1. The position control signal generator 28 generates a control signal to energize a position control device 29 which is similar to block 17 to move the lenses 22 and 23 and the input end 211 toward the center of the condensing lens 22 so that the light beam may be incident on the predetermined point of incidence at the condensing lens 23.

The drawing shows the state wherein the input end 211 of the light guide 21 is moved to 211' as the result of the foregoing control operations. In this manner, the position and angle of incidence of the input light beam at the input end surface of the converging light guide 21 can be kept constant, and thus, the position and angle of emission at the output end 212 of light guide 21 can be kept constant.

Figure 3:
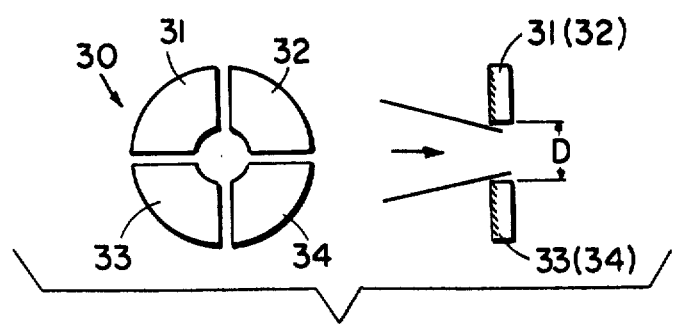
FIG. 3 is a schematic detail of a detector element for use in the embodiments of FIGS. 1 and 2.

FIG. 3 shows an example of the shape of the detectors 12, 131, 132, 24 and 27, which may be used in the embodiments of FIGS. 1 and 2. As is shown, detector 30 is radially divided into four sections 31, 32, 33 and 34. The outputs of these detector sections are different from each other depending upon the amount of light incident on each detector section. The intensity distribution of the light beams in two dimensions can easily be sensed by this structure. The central aperture in the detector 30 is for passing the light beam therethrough, the diameter D being determined by the spot size of the light beam.

What we claim is:

1. A light deflection correction device comprising:
   a fibrous converging light guide having a refractive index gradient which is greatest at the axis of said light guide and decreases quadratically toward the surface thereof with respect to the radial distance from the axis;
   means for detecting the position of incidence of an input light beam incident at an input end surface of said light guide;
   means disposed in tandem with and behind said position detecting means for detecting the angle of incidence of the input light beam in cooperation with said position detecting means;
   means responsive to the output of said position and angle detecting means for generating control signals; and
   means responsive to said control signals for controlling the position and angle of incidence of said light beam at said input end surface so that said position and angle of incidence may be maintained at a predetermined value whereby the position and angle of emission of said light beam may be constant at the output end surface of said light guide.

2. The light deflection correction device claimed in claim 1, wherein said controlling means comprises a first means responsive to the output of said position detecting means for controlling the position of said one end surface with respect to the input light beam, and a second means responsive to the output of said angle detecting means for controlling the orientation of said input end surface with respect to the input light beam.

3. A light deflection correction device comprising:
   a fibrous converging light guide having a refractive index gradient which is greatest at the axis of said light guide and decreases gradually toward the surface thereof;
   means for detecting the position and angle of incidence of an input light beam incident at one end surface of said light guide,
   means responsive to the output of said detecting means for generating control signals;
   means responsive to said control signals for controlling the position and angle of incidence of said light beam relative to said input end surface so that said position and angle of incidence may be maintained at a predetermined value whereby the position and angle of emission of said light beam may be constant at the other end surface of said light guide,
   wherein said detecting means comprises a first detector for detecting the position of said light beam, and a tandem second detector for detecting the angle of said light beam, wherein said position and angle detectors are disposed, respectively, at the input and the output end of said guide.